United States Patent
Lee et al.

(10) Patent No.: US 10,551,670 B2
(45) Date of Patent: Feb. 4, 2020

(54) LIQUID CRYSTAL DISPLAY WITH IMPROVED COLOR REPRODUCIBILITY

(71) Applicant: Samsung Display Co., Ltd, Yongin-si, Gyeonggi-do (KR)

(72) Inventors: Kwang Keun Lee, Osan-si (KR); Young Min Kim, Yongin-si (KR); Hae Il Park, Seoul (KR); Seon-Tae Yoon, Seoul (KR); Baek Hee Lee, Yongin-si (KR); Jun Han Lee, Incheon (KR)

(73) Assignee: Samsung Display Co., Ltd. (KR)

( * ) Notice: Subject to any disclaimer, the term of this patent is extended or adjusted under 35 U.S.C. 154(b) by 466 days.

(21) Appl. No.: 14/976,028

(22) Filed: Dec. 21, 2015

(65) Prior Publication Data

US 2016/0195774 A1    Jul. 7, 2016

(30) Foreign Application Priority Data

Jan. 5, 2015    (KR) ................. 10-2015-0000729
Jun. 29, 2015   (KR) ................. 10-2015-0091955

(51) Int. Cl.
G02F 1/1335    (2006.01)
G02F 1/1333    (2006.01)

(52) U.S. Cl.
CPC .. G02F 1/133617 (2013.01); G02F 1/133504 (2013.01); G02F 1/133377 (2013.01)

(58) Field of Classification Search
None
See application file for complete search history.

(56) References Cited

U.S. PATENT DOCUMENTS

| | | | | |
|---|---|---|---|---|
| 6,144,429 A | * | 11/2000 | Nakai | G02F 1/133553 349/113 |
| 7,750,984 B2 | | 7/2010 | Ha et al. | |
| 8,277,064 B2 | | 10/2012 | Willemsen et al. | |
| 2008/0070153 A1 | | 3/2008 | Ioku et al. | |
| 2012/0077279 A1 | * | 3/2012 | Wiesner | G01N 21/76 436/135 |
| 2012/0113672 A1 | * | 5/2012 | Dubrow | B82Y 20/00 362/602 |
| 2012/0326180 A1 | * | 12/2012 | Ohe | H01L 27/322 257/88 |

(Continued)

FOREIGN PATENT DOCUMENTS

EP    0971246 A1 *  1/2000 ........... C09C 1/0015
JP    H05-034514 A    2/1993

(Continued)

OTHER PUBLICATIONS

G. J. Heo et al., Color PH-LCD Using STN Mode, IDW'87, 221-224, Dec. 7, 1998.

(Continued)

*Primary Examiner* — Edward J Glick
*Assistant Examiner* — Anthony G Quash
(74) *Attorney, Agent, or Firm* — Innovation Counsel LLP

(57) ABSTRACT

A liquid crystal display according to an exemplary embodiment of the inventive concept includes a display panel and a color conversion panel disposed on the display panel, in which the color conversion panel includes a color conversion media layer and a scattering layer including a scatterer and at least one of a pigment and a dye adsorbed on the scatterer.

20 Claims, 13 Drawing Sheets

(56) References Cited

U.S. PATENT DOCUMENTS

| | | | |
|---|---|---|---|
| 2013/0250220 A1* | 9/2013 | Kim | G02F 1/1341 349/123 |
| 2014/0168572 A1* | 6/2014 | Iwata | H01L 51/5268 349/61 |
| 2014/0192294 A1 | 7/2014 | Chen et al. | |
| 2014/0321101 A1* | 10/2014 | Kadowaki | G02F 1/1336 362/84 |
| 2014/0368766 A1* | 12/2014 | Shibata | G02B 5/201 349/61 |
| 2016/0062179 A1* | 3/2016 | Eguchi | G02F 1/133514 349/25 |

FOREIGN PATENT DOCUMENTS

| | | |
|---|---|---|
| JP | 2005-209662 | 8/2005 |
| JP | 2006-308859 A | 11/2006 |
| JP | 2009-244383 A | 10/2009 |
| JP | 2010-078876 | 4/2010 |
| JP | 2014-153604 A | 8/2014 |
| KR | 10-2005-0105836 A | 11/2005 |
| KR | 10-2012-0097774 A | 9/2012 |
| WO | 2012-121372 A1 | 9/2012 |
| WO | 2013-118653 A1 | 8/2013 |

OTHER PUBLICATIONS

Jeong Rok Oh et al., Highly efficient-color display based on blue LED backlight and electrochromic light valve coupled with front emitting phosphor, Optics Express vol. 19, No. 17, 16022-16031, Aug. 5, 2011.

Swie Lan Njo et al., Light-Efficient Liquid Crystal Displays Using Photoluminescent, SID 00 Digest, 343-345, May 1, 2000.

* cited by examiner

10,551,670 B2

LIQUID CRYSTAL DISPLAY WITH IMPROVED COLOR REPRODUCIBILITY

CROSS-REFERENCE TO RELATED APPLICATION

This application claims priority to and the benefit of Korean Patent Application No. 10-2015-0000729 filed in the Korean Intellectual Property Office on Jan. 5, 2015 and Korean Patent Application No. 10-2015-0091955 filed in the Korean Intellectual Property Office on Jun. 29, 2015, the entire content of which is incorporated herein by reference.

BACKGROUND

(a) Field

The present invention relates to a liquid crystal display.

(b) Description of the Related Art

A liquid crystal display is, currently, one of the most widely used flat panel displays. Typically, a liquid crystal display device includes two display panels on which electrodes are disposed and a liquid crystal layer interposed therebetween, and controls the intensity of transmitted light by applying a voltage to the electrodes to rearrange liquid crystal molecules of the liquid crystal layer.

Among the liquid crystal displays, the liquid crystal display that is most commonly used has a structure in which field generating electrodes are each provided in two display panels. Among the structures, the mainstream structure is a structure where a plurality of thin film transistors and pixel electrodes are arranged in a matrix form in one display panel (hereinafter, referred to as "thin film transistor array panel"), color filters of red, green and blue are disposed in the other display panel (hereinafter, referred to as "common electrode panel"), and a common electrode covers the entire surface thereof.

However, in the liquid crystal display, light loss occurs in a polarizer and a color filter. In order to reduce light loss and implement the high efficiency liquid crystal display, a PL-liquid crystal display (Photo-Luminescent LCD) including a color conversion material has been proposed.

In the PL-liquid crystal display, a color conversion media (CCM) is used instead of the color filter, and when light emitted from a light source is supplied to the color conversion media, a portion of light emitted from the light source may be diffused in an inclination direction to be supplied to an adjacent pixel. This phenomenon is called an optical cross-talk, and thus there is a problem in that color reproducibility is reduced.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a liquid crystal display device where color mixing of a color conversion panel is controlled and a contrast ratio is improved by increasing light output efficiency.

An exemplary embodiment provides a liquid crystal display including: a display panel, and a color conversion panel disposed on the display panel, in which the color conversion panel includes a plurality of color conversion media layers, and a scattering layer including a scatterer and at least one of a dye and a pigment adsorbed on the scatterer.

At least one of the plurality of color conversion media layers may include at least one of a fluorescent substance and a quantum dot.

The plurality of color conversion media layers may include a photosensitive resin.

The scatterer may include at least one of $TiO_2$, $ZrO_2$, $Al_2O_3$, $In_2O_3$, ZnO, $SnO_2$, $Sb_2O_3$, and ITO.

A density of the scattering layer may be larger than a density of the color conversion media layer.

A refractive index of the scattering layer may be about 1.5 or more. The plurality of color conversion media layers may include a red color conversion media layer, a green color conversion media layer, and a transparent layer.

The liquid crystal display device may further include a light blocking member provided between a red color conversion media layer, a green color conversion media layer, and a transparent layer.

The transparent layer may not include the fluorescent substance and the quantum dot.

The scattering layer provided on the transparent layer may not include the dye and the pigment.

The dye and the pigment may absorb light of a blue color.

The liquid crystal display may further include a light assembly supplying light to the display panel and the color conversion panel.

The light assembly may be a light emitting diode.

The light emitting diode may emit a predetermined wavelength band such as ultraviolet rays or blue light.

The display panel may be disposed between the light assembly and the color conversion panel.

The display panel may further include a liquid crystal panel and polarizers provided in lateral sides of the liquid crystal panel.

The liquid crystal panel may include: a thin film transistor provided on a first insulation substrate; a pixel electrode connected with the thin film transistor; a second insulation substrate facing the first insulation substrate at a distance from the first insulation substrate; a liquid crystal layer provided between the first insulating substrate and the second insulating substrate; and a common electrode provided between the liquid crystal layer and the second insulating substrate.

The liquid crystal panel may include: an insulation panel; a thin film transistor provided on the insulation substrate; a pixel electrode connected with the thin film transistor; a roof layer disposed facing the pixel electrode; and a liquid crystal layer filling a plurality of microcavities provided between the pixel electrode and the roof layer.

According to the exemplary embodiment of the present invention, through the liquid crystal display, color reproducibility and a contrast ratio are improved, and thus it is possible to provide better display quality and a wide view angle can be provided through a quantum dot.

DETAILED DESCRIPTION OF THE EMBODIMENTS

Figure 1:
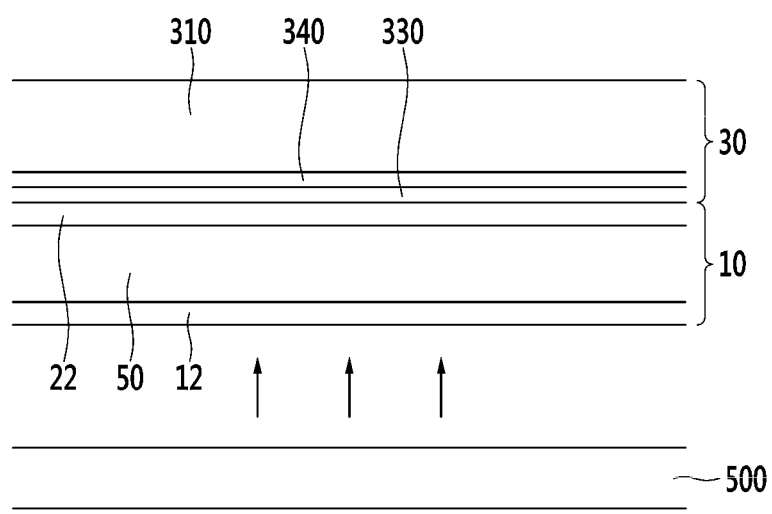
FIG. 1 is a schematic cross-sectional view of a display device according to an exemplary embodiment of the inventive concept.

The inventive concept will be described more fully hereinafter with reference to the accompanying drawings, in which exemplary embodiments of the invention are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, when an element is referred to as being "on" another element, it can be understood that the element is provided at a gravity direction or the opposite direction.

Figure 3:
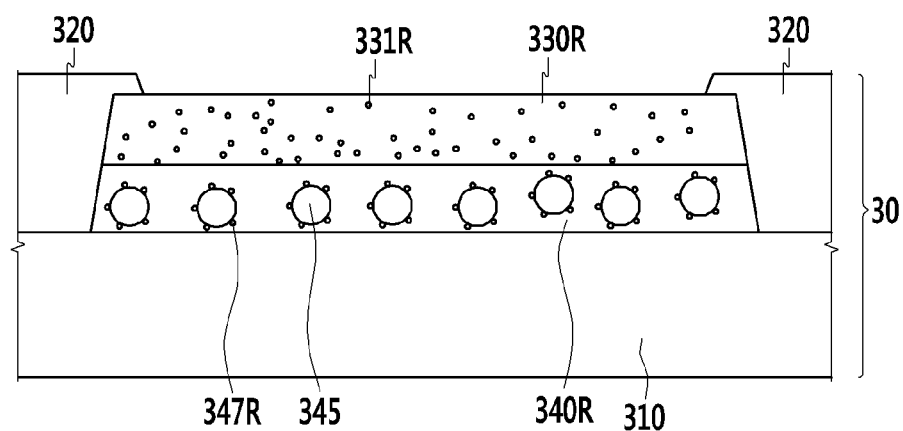
FIG. 3 is a cross-sectional view of a red color conversion media layer according to the exemplary embodiment of the inventive concept.
Figure 4:
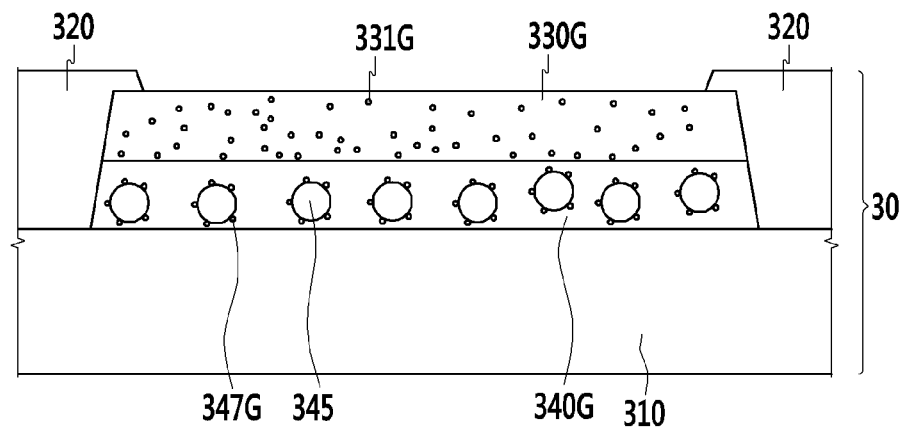
FIG. 4 is a cross-sectional view of a green color conversion media layer according to the exemplary embodiment of the inventive concept.
Figure 5:
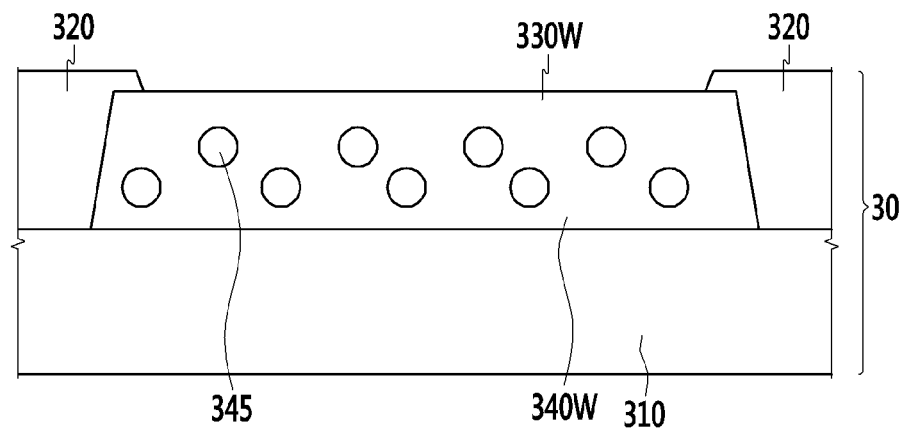
FIG. 5 is a cross-sectional view of a transparent layer according to the exemplary embodiment of the inventive concept.

Hereinafter, a liquid crystal display according to an exemplary embodiment of the inventive concept will be described with reference to FIGS. 1 to 5. FIG. 1 is a schematic cross-sectional view of a liquid display device according to the exemplary embodiment of the inventive concept, FIG. 2 is a cross-sectional view of a color conversion panel according to the exemplary embodiment of the inventive concept, FIG. 3 is a cross-sectional view of a red color conversion media layer according to the exemplary embodiment of the inventive concept, FIG. 4 is a cross-sectional view of a green color conversion media layer according to the exemplary embodiment of the inventive concept, and FIG. 5 is a cross-sectional view of a transparent layer according to the exemplary embodiment of the inventive concept.

Figure 2:
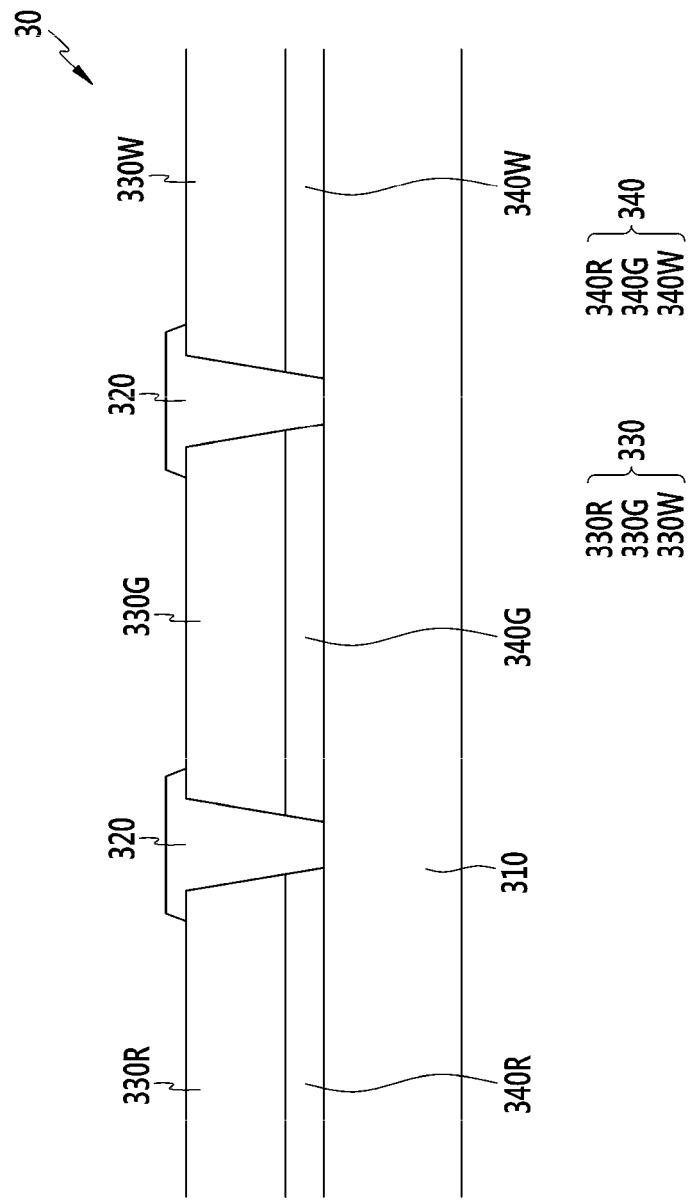
FIG. 2 is a cross-sectional view of a color conversion panel according to the exemplary embodiment of the inventive concept.

First, referring to FIG. 1 and FIG. 2, a liquid crystal display device according to an exemplary embodiment of the inventive concept includes a color conversion panel 30, a display panel 10, and a light assembly 500.

The display panel 10 may include a liquid crystal panel 50 displaying an image, and polarizers 12 and 22 provided on respective sides of the liquid crystal panel 50 to polarize light from the light assembly 500. A first polarizer 11 and a second polarizer 22 are disposed at respective sides of the liquid crystal panel 50 to polarize light that is incident from the light assembly 500. The liquid crystal panel 50 will be described in detail later with reference to FIG. 10 to FIG. 13.

The light assembly 500 may include a light source disposed beneath the first polarizer 12 and generating light, and a light guide plate (not illustrated) receiving the light and guiding the received light in a direction of the display panel 10 and a color conversion panel 30.

As an example of the inventive concept, the light assembly 500 may include at least one light emitting diode, and for example, may be a blue light emitting diode. The light source according to the inventive concept may be an edge type light assembly disposed on at least one side of the light guide plate, or may be a direct type where the light source of the light assembly 500 is disposed in a direct lower portion of the light guide plate (not illustrated). However, the light source is not limited thereto.

The color conversion panel 30 according to the exemplary embodiment of the inventive concept may be disposed on the display panel 10, and more specifically, may be disposed on the second polarizer 22 and come into direct contact therewith.

As shown in FIG. 2, the color conversion panel 30 includes a plurality of color conversion media layers 330R, 330G and 330W disposed on a substrate 310, and light blocking members 320 disposed between the plurality of color conversion media layers 330R, 330G and 330W.

The plurality of color conversion media layers comprise a red color conversion media layer 330R, a green color conversion media layer 330G, and a transparent layer 330W.

The light blocking member 320 divides regions where the red color conversion media layer 330R, the green color conversion media layer 330G, and the transparent layer 330W are disposed, and the red color conversion media layer 330R, the green color conversion media layer 330G and the transparent layer 330W are disposed between the light blocking members 320.

The red color conversion media layer 330R converts a color of blue light supplied from the light assembly 500 into red. To this end, the red color conversion media layer 330R may include a red fluorescent substance, and the red fluorescent substance may be at least one material of (Ca, Sr, Ba)S, (Ca, Sr, Ba)$_2$Si$_5$N$_8$, CASN (CaAlSiN$_3$), CaMoO$_4$, and Eu$_2$Si$_5$N$_8$.

The green color conversion media layer 330G converts the color of blue light supplied from the light assembly 500 into green. The green color conversion media layer 330G may include a green fluorescent substance, and the green fluorescent substance may be at least one material of yttrium aluminum garnet (YAG), (Ca, Sr, Ba)$_2$SiO$_4$, SrGa$_2$S$_4$, BAM, α-SiAlON, β-SiAlON, Ca$_3$Sc$_2$Si$_3$O$_{12}$, Tb$_3$Al$_5$O$_{12}$, BaSiO$_4$, CaAlSiON, and (Sr$_{1-x}$Ba$_x$)Si$_2$O$_2$N$_2$. In this case, x may be any number between 0 and 1.

Further, the red color conversion media layer 330R and the green color conversion media layer 330G may include a quantum dot that converts colors instead of a fluorescent substance. The quantum dot may be selected from a Group II-VI compound, the Group III-V compound, a Group IV-VI compound, a Group IV element, a Group IV compound, and a combination thereof.

The Group II-VI compound may be selected from the group consisting of a binary compound selected from the group consisting of CdSe, CdTe, ZnS, ZnSe, ZnTe, ZnO, HgS, HgSe, HgTe, MgSe, MgS and a mixture thereof; a tertiary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound may be selected from the group consisting of a binary compound selected from the group consisting of GaN, GaP, GaAs, GaSb, AN, AlP, AlAs, AlSb, InN, InP, InAs, InSb, and a mixture thereof; a tertiary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a quaternary compound selected from the group consisting of GaAlNAs, GaAlNSb, GaAl-PAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound may be selected from the group consisting of a binary compound selected from the group consisting of SnS, SnSe, SnTe, PbS, PbSe, PbTe, and a mixture thereof; a tertiary compound selected from the group consisting of SnSeS, SnSeTe, SnSTe, PbSeS, PbSeTe, PbSTe, SnPbS, SnPbSe, SnPbTe, and a mixture thereof; and a quaternary compound selected from the group consisting of SnPbSSe, SnPbSeTe, SnPbSTe, and a mixture thereof. The Group IV element may be selected from the group consisting of Si, Ge, and a mixture thereof. The Group IV compound may be a binary compound selected from the group consisting of SiC, SiGe, and a mixture thereof.

In this case, the binary compound, the tertiary compound, or the quaternary compound may exist in particles at a uniform concentration, or may exist in the same particle divided into states where concentration distributions are partially different. Further, the color conversion media layer may have a core/shell structure where one quantum dot surrounds another quantum dot. An interface between the core and the shell may have a concentration gradient, such that a concentration of an element existing in the shell is gradually reduced nearing to the center thereof.

The quantum dot may have a full width of half maximum (FWHM) of an emission wavelength spectrum of about 45 nm or less, preferably about 40 nm or less, and more preferably about 30 nm or less. In this range, color purity or color reproducibility may be improved. In addition, light emitted through such a quantum dot is emitted in every direction, and therefore a wide viewing angle can be improved.

Further, a form of the quantum dot is a form generally used in the art and is not particularly limited, but more specifically, forms such as spherical, pyramidal, multi-arm-shaped, or cubic nanoparticles, nanotubes, nanowires, nanofibers, and nanoplate-shaped particles may be used.

The transparent layer 330W is formed of a transparent polymer, and blue light supplied from the light assembly 500 is transmitted and displays a blue color. The transparent layer 330W in an area where blue light is emitted may directly emit incident blue light without using an additional fluorescent substance or quantum dot.

In this case, materials of the red color conversion media layer, the green color conversion media layer, and the transparent layer may be a photosensitive resin, and accordingly, they may be formed through a photolithography process.

Next, as shown in FIG. 2, the color conversion panel 30 according to the exemplary embodiment of the inventive concept further includes a scattering layer 340 disposed on the substrate 310. The scattering layer 340 includes a scatterer 345 and at least one of a pigment and dyes 347R or 347G adsorbed on the scatterer 345.

The scattering layer 340 is formed by phase separation with the color conversion media layer 330 during a process of manufacturing the color conversion panel 30. Accordingly, a density of the scattering layer 340 may be greater than that of the color conversion media layer 330 for phase separation with the color conversion media layer 330, or may undergo a surface treatment such that the scattering layer 340 and the color conversion media layer 330 may have different characteristics.

The scatterer 345 may be made of any material of $TiO_2$, $ZrO_2$, $Al_2O_3$, $In_2O_3$, ZnO, $SnO_2$, $Sb_2O_3$, and ITO, and is not limited thereto, and any material scattering incident light is feasible. The scatterer 345 scatters incident light to increase a light output quantity of light passing through the color conversion panel 30 or to equalize front luminance and side luminance.

The scatterer 345 according to the exemplary embodiment of the inventive concept has a refractive index of about 1.5 or more. The scattering layer 340 including the scatterer 345 having the aforementioned refractive index may allow a portion of outputted light to face back the color conversion media layers 330R and 330G and thus increase light output efficiency. That is, the scattering layer 340 scatters incident blue light to output light in an increased quantity so that the scattering layer has improved light efficiency.

At least one of the pigment and the dyes 347R and 347G according to the exemplary embodiment of the inventive concept are connected (or adsorbed) to the scatterer 345 to absorb blue light passing through the color conversion media layers 330R and 330G. As the pigment and the dyes 347R and 347G, any material for absorbing blue light is feasible. This is because in the dye or the pigment, in the case where blue light passing through the color conversion media layer 330 is outputted from the red color conversion media layer 330R, the green color conversion media layer 330G, or the like as it is, deterioration of display quality due to color mixing can be prevented.

As described above, the aforementioned color conversion panel 30 according to the exemplary embodiment of the inventive concept includes the color conversion media layer 330 and the scattering layer 340. Meanwhile, constituent elements of the color conversion media layer 330 and the scattering layer 340 may be different from each other according to a color of outputted light. That is, constitutions of the color conversion media layer 330 and the scattering layer 340 may be partially different from each other according to regions outputting red, green, and blue lights. Hereinafter, the color conversion media layer 330 and the scattering layer 340 according to the color of the outputted light will be more specifically described.

First, reviewing an area of the color conversion panel 30 outputting red light with reference to FIG. 3, the red color conversion media layer 330R includes at least one of a fluorescent substance and a quantum dot 331R converting incident blue light into red light.

The scattering layer 340R coming into contact with the red color conversion media layer 330R may scatter light outputted from the red color conversion media layer 330R, or scatter again blue light that is not converted into red light by the fluorescent substance or the quantum dot 331R by the red color conversion media layer 330R. Again, light scattered by the red color conversion media layer 330R may be converted into red light by the fluorescent substance or the quantum dot 331R to be outputted.

Further, the pigment or the dye 347R disposed in the scattering layer 340R and adsorbed on the scatterer 345 absorbs blue light that is not converted into red light by the fluorescent substance or the quantum dot 331R disposed in the red color conversion media layer 330R to prevent blue light from being outputted in the region emitting red light.

Accordingly, in the color conversion panel outputting red light according to the exemplary embodiment of the inventive concept, the color conversion media layer may have excellent color reproducibility without making color mixture and light output efficiency improved by the scatterer.

Next, referring to FIG. 4, the color conversion panel 30 outputting green light will be reviewed. First, the green color conversion media layer 330G on which blue light is incident includes a fluorescent substance or a quantum dot 331G converting incident blue light into green light.

The scattering layer 340G coming into contact with the green color conversion media layer 330G may scatter light outputted from the green color conversion media layer 330G, or scatter again blue light that is not converted into green light by the fluorescent substance or the quantum dot 331G by the color conversion media layer 330. Again, light scattered by the green color conversion media layer 330G may be converted into green light by the fluorescent substance or the quantum dot 331G to be outputted.

Further, the dye 347G adsorbed on the scatterer 345 disposed in the scattering layer 340G absorbs blue light that is not converted into green light by the fluorescent substance or the quantum dot 331G disposed in the green color conversion media layer 330G to prevent blue light from being outputted in the region emitting green light.

Thus, the color conversion panel emitting green light has excellent color reproducibility without making color mixture and light output efficiency improved by the scatterer.

Next, referring to FIG. 5, the color conversion panel 30 outputting blue light will be reviewed, The transparent layer 330W corresponding to the region outputting blue light includes a material (for example, a polymer such as a photosensitive resin) outputting incident blue light without a separate fluorescent substance or quantum dot.

As described above, the separate fluorescent substance or quantum dot is not disposed in the region outputting incident light as it is, and the pigment and the dye absorbing blue light is not disposed. Therefore, the color conversion panel 30 outputting blue light includes a scattering layer 340W including a scatterer 345 scattering incident light. According to the aforementioned exemplary embodiment, the transparent layer 330W and the scattering layer 340W may be formed without separate division of layers.

According to the aforementioned display device, the exemplary embodiment of the inventive concept may provide the color conversion panel having improved color reproducibility by increasing light output efficiency and preventing color mixing, and thus may provide a display device having better display quality.

Hereinafter, a method of manufacturing the color conversion panel according to the exemplary embodiment of the inventive concept will be reviewed with reference to FIGS. 6 to 9. FIGS. 6 to 9 are a cross-sectional views according to a process of manufacturing the color conversion panel according to the exemplary embodiment of the inventive concept.

Figure 6:
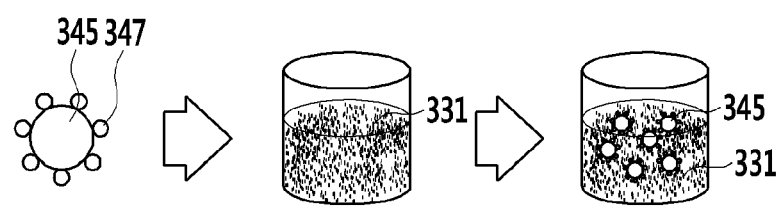
FIGS. 6, 7, 8 and 9 are a cross-sectional view according to a process of manufacturing a color conversion panel according to the exemplary embodiment.

First, like FIG. 6, the scatterer 345 in a state where at least one of the pigment and the dye 347 is adsorbed is prepared.

In addition, a photosensitive resin including the red or green fluorescent substance (or quantum dot) 331 is prepared. Meanwhile, the photosensitive resin for manufacturing the transparent layer may not include the fluorescent substance or the quantum dot. The prepared photosensitive resin and scatterer on which the pigment or the dye is adsorbed are dispersed to prepare the photosensitive resin for manufacturing the color conversion media layer.

Figure 7:
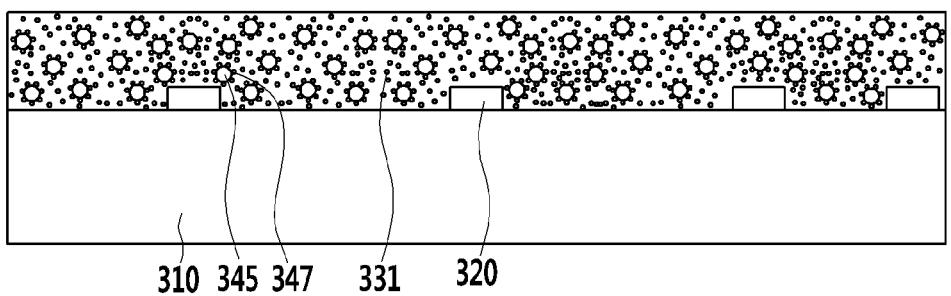

Next, like FIG. 7, the photosensitive resin where the scatterer 345 to which the fluorescent substance and the pigment or the dye 347 is adsorbed is dispersed is applied on the insulation substrate 310 in which the light blocking member 320 is disposed.

Figure 8:
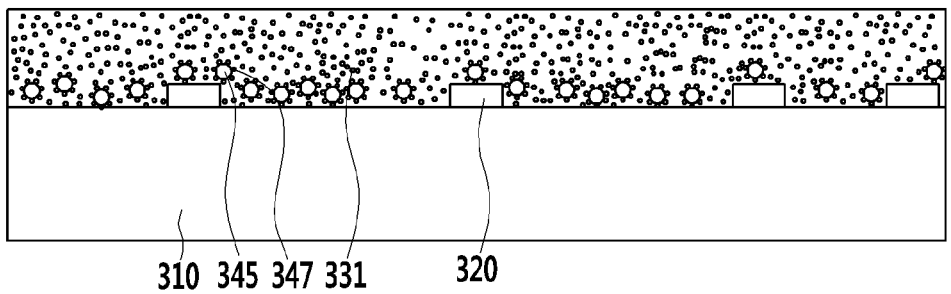

In addition, if a predetermined time elapses, like FIG. 8, the scatterer 345 dispersed in the photosensitive resin and the pigment or the dye 347 adsorbed thereon are subjected to phase separation on the insulation substrate 310 according to density or surface property differences and the like. This is because a density of a general photosensitive resin is about 1.1 to 1.2 $g/cm^3$ and the scatterer 345 of a titanium oxide material according to the exemplary embodiment of the inventive concept may have a density of about 4.3 $g/cm^3$. Further the general photosensitive resin may have non-polar but the scatterer on which the pigment or the dye is adsorbed has polarity, according to the aforementioned physical property difference.

Thus, if time elapses, phase separation may be naturally caused.

Figure 9:
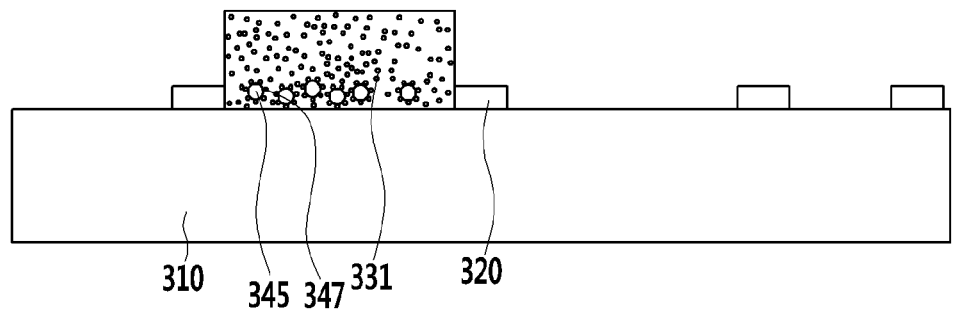

Next, like FIG. 9, the scattering layer 340 and the color conversion media layer 330 disposed between the light blocking members 320 are formed by using a photolithography method. In the above, the color conversion media layer and the scattering layer formed by using the photolithography method are described, but manufacturing is not limited thereto, and of course, the color conversion media layer and the scattering layer may be manufactured by using a printing method, and thus manufacturing is not limited to any manufacturing method.

Figure 10:
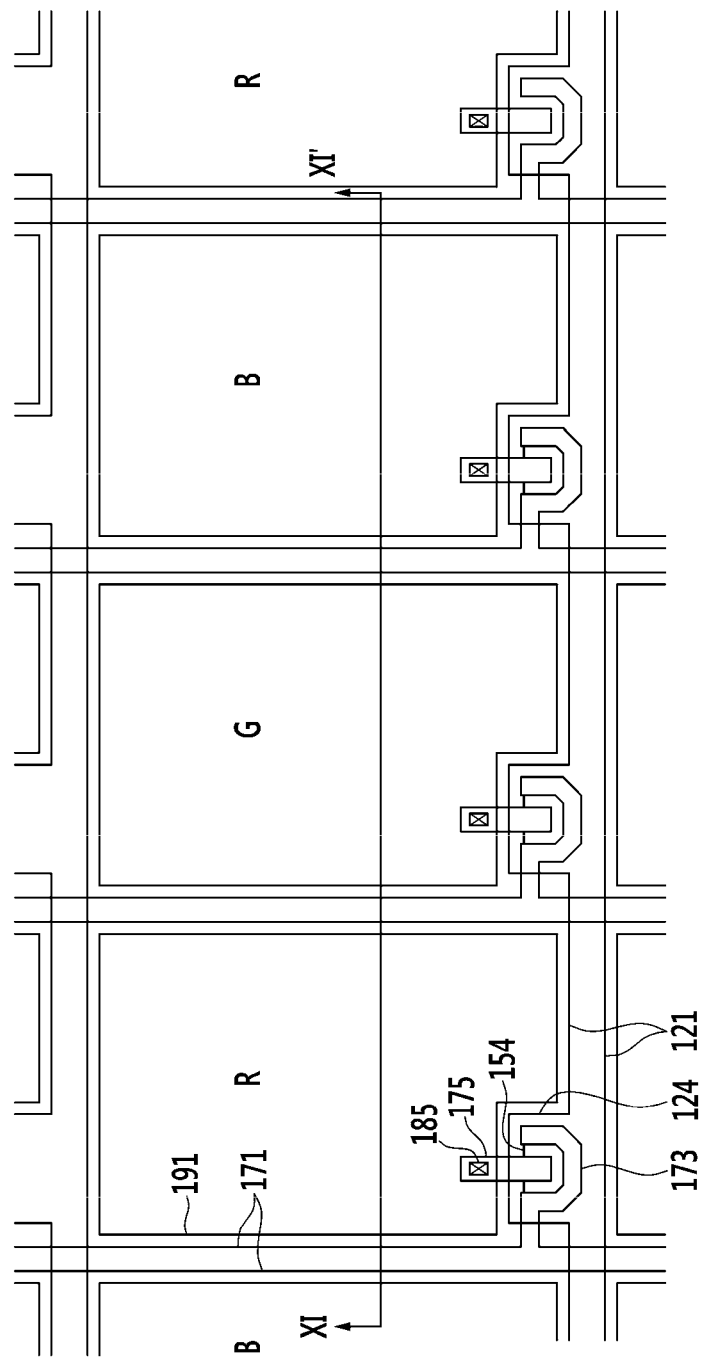
FIG. 10 is a top plan view of a liquid crystal display according to an exemplary embodiment.

Hereinafter, a liquid display device according to an exemplary embodiment of the inventive concept will be reviewed with reference to FIGS. 10 and 11. FIG. 10 is a top plan view of a liquid crystal display according to an exemplary embodiment of the inventive concept, and FIG. 11 is a cross-sectional view of FIG. 10, taken along the line XI-XI'.

Figure 11:
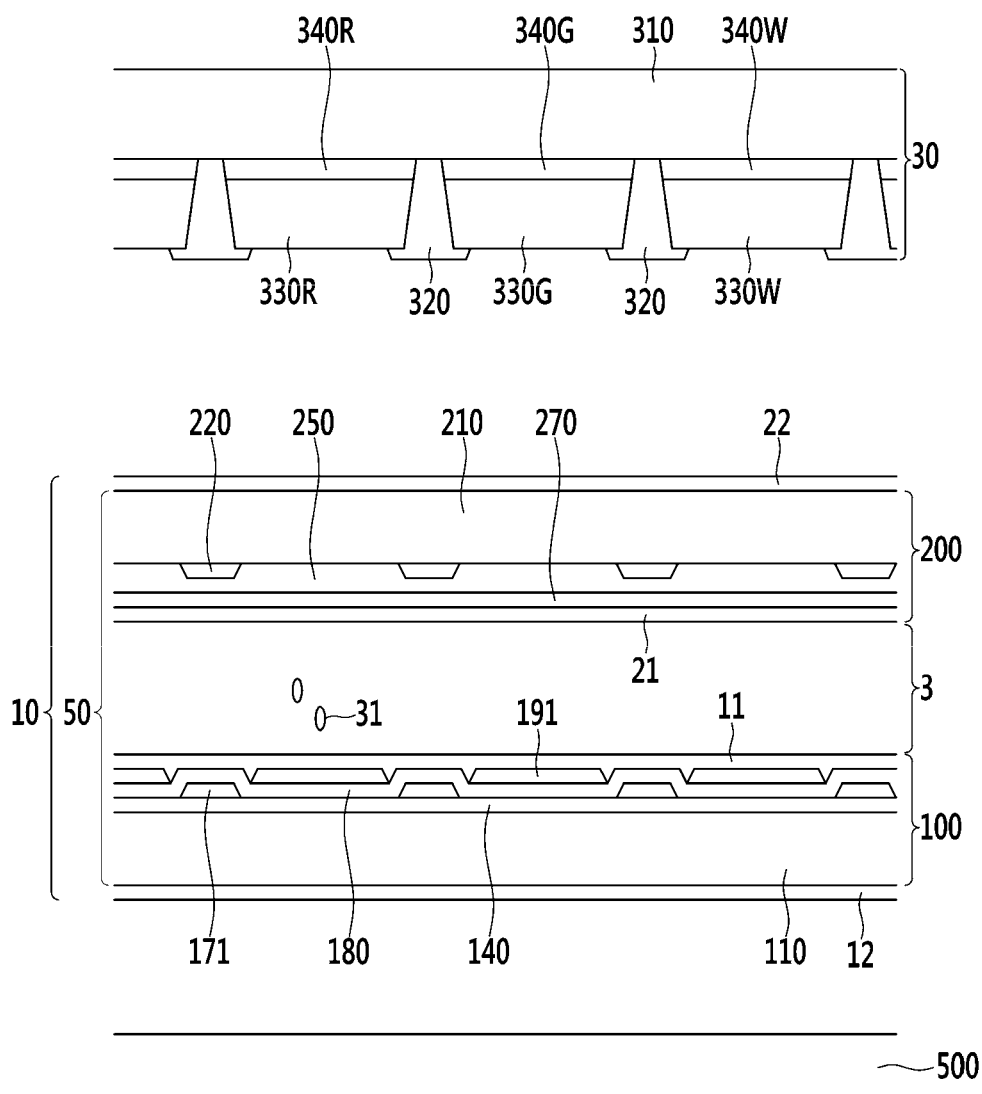
FIG. 11 is a cross-sectional view of FIG. 10, taken along the line XI-XI'.

Referring to FIG. 10 and FIG. 11, a liquid crystal display according to an exemplary embodiment of the inventive concept includes a light assembly 500, a display panel 10 disposed on the light assembly 500, and a color conversion panel 30 disposed on the display panel 10.

The light assembly 500 and the color conversion panel 30 according to the exemplary embodiment of the inventive concept are the same as the light assembly and the color conversion panel that have been described above with reference to FIG. 1, and therefore no further description will be provided.

The color conversion panel is described above with reference to FIG. 1, wherein the elements that are disposed toward one direction are referred to as being "on" another element.

However, the plurality of color conversion media layers 330R, 330G, 330W and the scattering layers 340R, 340G, 340W in FIGS. 10 and 11 are provided between the substrate 310 and the display panel 10. In other words, the color conversion panel, along with FIGS. 10 and 11 comprise the same elements that are referred to as being "on" another element but are disposed in opposite directions.

The display panel 10 includes a lower display panel 100 including a thin film transistor, an upper display panel 200 including a second insulating substrate 210 that faces the lower display panel 100, and a liquid crystal panel 50 including a liquid crystal layer 3 provided between the lower display panel 100 and the upper display panel 200 for displaying an image.

Polarizers 12 and 22 are provided in lateral sides of the liquid crystal panel 50, and in this case, one or more of a coating-type polarizer, an adhesive-type polarizer and a wire grid polarizer may be used as the polarizer 12.

Such a polarizer 12 may be provided in one surface of the upper display panel 200 using various methods such as a film form, a coating form, an attachment form, and the like. However, such a description is one example, and thus is not restrictive. A plurality of pixel electrodes are disposed in a matrix form on a first insulating layer 110 of the lower display panel 100.

A gate line 121 extending in a row direction and including a gate electrode 124, a gate insulating layer 140 disposed on the gate line 121, a semiconductor layer 154 disposed on the gate insulating layer 140, a data line 171 disposed on the semiconductor layer 154, extending in a column direction, and including a source electrode 173 and a drain electrode 175, a passivation layer 180 disposed on the drain electrode 175, and a pixel electrode 191 connected to the drain electrode 175 through a contact hole are disposed on the first insulating layer 110. A lower alignment layer 11 is disposed on the pixel electrode 191, and the lower alignment layer 11 may be a vertical alignment layer.

A semiconductor layer 154 disposed on the gate electrode 124 forms a channel layer in a region exposed by the source electrode 173 and the drain electrode 175, and the gate electrode 124, the semiconductor layer 154, the source electrode 173, and the drain electrode 175 form one thin film transistor.

Next, a second insulating substrate 210 is distanced from the first insulating substrate 110 while facing the first insulating substrate 110. A light blocking member 220, a planarization layer 250, a common electrode 270 are disposed between a second insulating substrate 210 and a liquid crystal layer 3.

Specifically, a light blocking member 220 is provided at one surface of a second insulating substrate 210 facing the first insulating substrate 110. A planarization layer 250 providing a flat surface may be provided at one surface of the light blocking member 220 facing the first insulating substrate 110, and a common electrode 270 is provided at one surface of the planarization layer 250 facing the first insulating substrate 110. The planarization layer 250 may be omitted according to an exemplary embodiment of the inventive concept. An upper alignment layer 21 is provided at one surface of the common electrode 270 facing the first insulation substrate 110.

The common electrode 270 receiving a common voltage forms an electric field with the pixel electrode 191, and arranges liquid crystal molecules 31 in the liquid crystal layer 3.

The liquid crystal layer 3 includes a plurality of liquid crystal molecules 31, and an arrangement direction of the liquid crystal molecules 31 is controlled by an electric field between the pixel electrode 191 and the common electrode 270.

According to arrangement of the liquid crystal molecules, transmittance of light received from the light assembly 500 may be controlled to display an image.

The present specification describes a liquid crystal display panel where the liquid crystal panel 110 forms a vertical electric field, but is not limited thereto, and the liquid crystal display panel may be a display device such as a plasma display panel (PDP), an organic light emitting diode display (OLED), a surface conduction electron-emitter display (SED), a field emission display (FED), a vacuum fluorescent display (VFD), and an E-paper.

As described, according to the exemplary embodiment of the inventive concept, the light output ratio can be improved and color reproducibility can be improved and thus a display device having excellent display quality can be provided.

Figure 12:
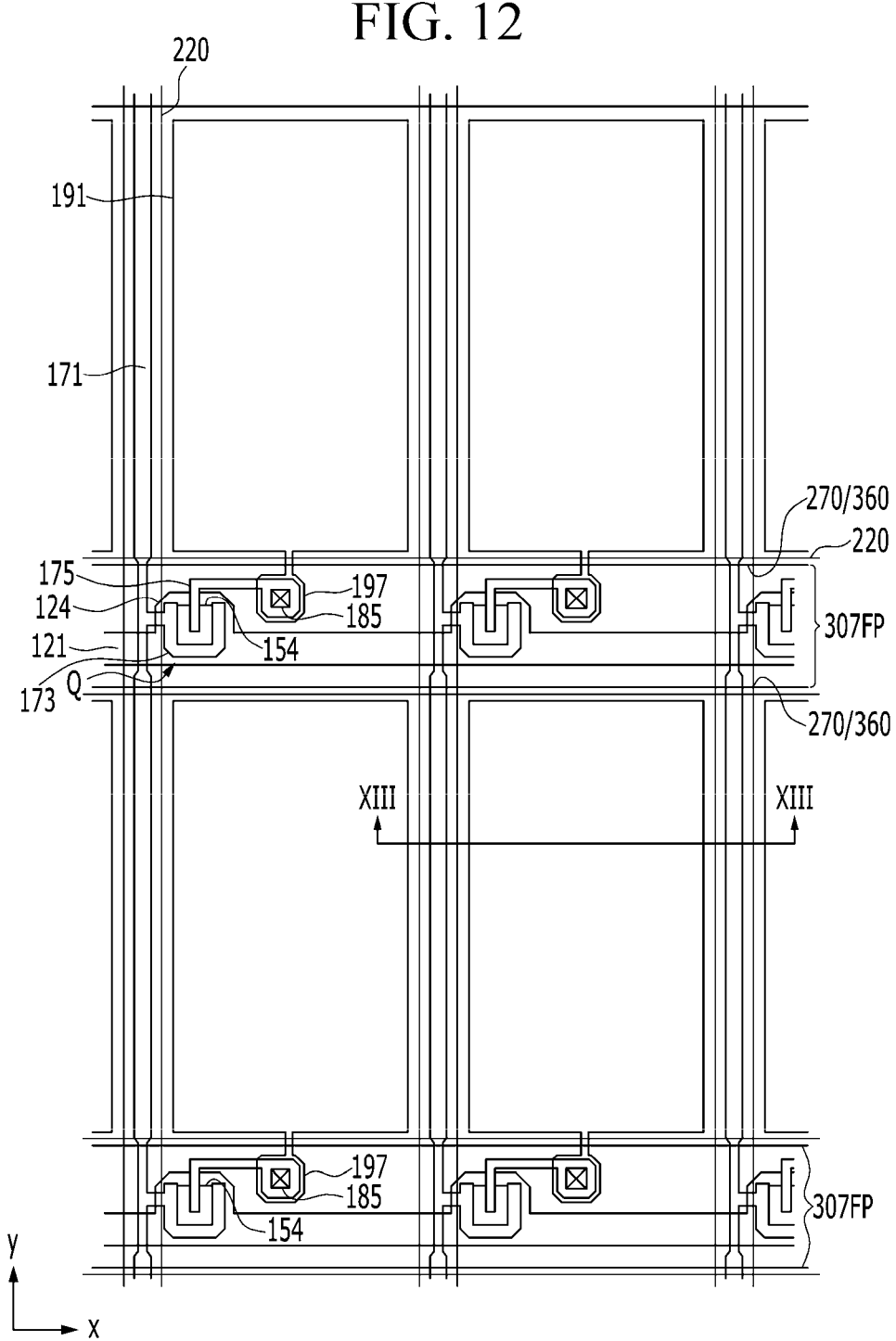
FIG. 12 is a top plan view of a pixel of the liquid crystal display according to the exemplary embodiment.
Figure 13:
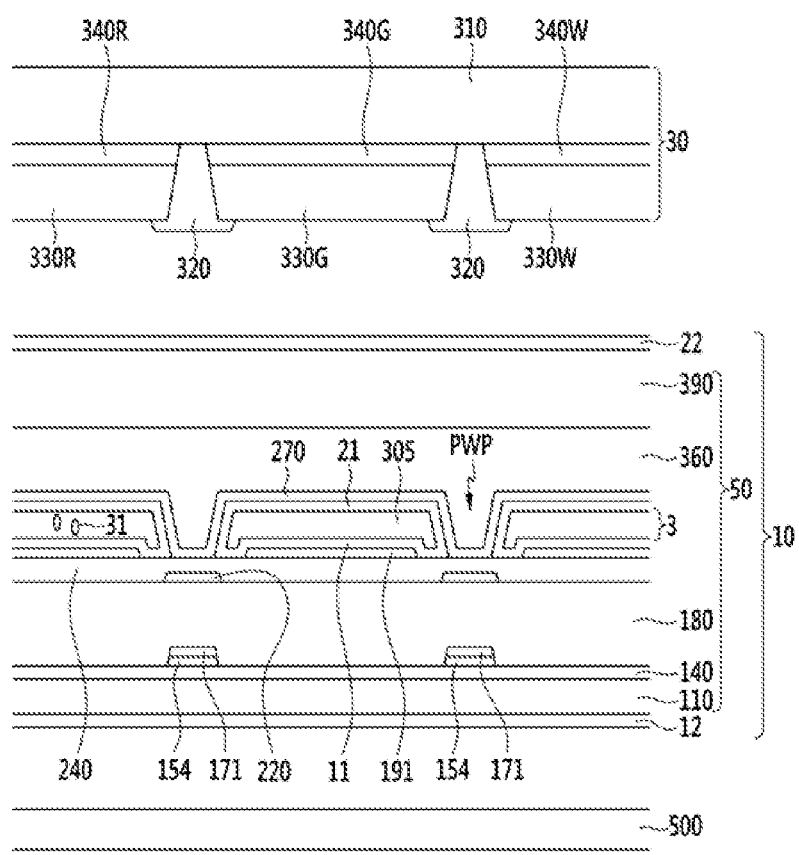
FIG. 13 is a cross-sectional view of FIG. 12, taken along the line XIII-XIII.

Hereinafter, a liquid crystal display according to an exemplary embodiment of the inventive concept will be described with reference to FIG. 12 and FIG. 13. FIG. 12 is a top plan view of a pixel of a liquid crystal display according to an exemplary embodiment of the inventive concept, and FIG. 13 is a cross-sectional view of FIG. 12, taken along the line XIII-XIII.

A liquid crystal display according to an exemplary embodiment of the inventive concept includes a display panel 10, a color conversion panel 30, and a light assembly 500. The display panel 10 may be disposed on the light assembly 500, and the color conversion panel 30 may be disposed on the display panel 10.

The display panel 10 may include a liquid crystal panel 50 and polarizers 12 and 22 provided in lateral sides of the liquid crystal panel 50. One or more of a coating-type polarizer, an adhesive-type polarizer and a wire grid polarizer may be used as the polarizer 12, and such a polarizer 12 may be provided in one surface of the upper display panel 200 using various methods such as a film form, a coating form, an attachment form, and the like. However, such a description is provided as an example, and thus is not restrictive.

The color conversion panel 30 and the light assembly 500 according to the embodiment of the inventive concept are also the same as the light assembly and the color conversion panel that have been described above, and therefore no further description will be provided.

The color conversion panel is described above with reference to FIG. 1, wherein the elements that are disposed toward one direction are referred to as being "on" another element.

However, the plurality of color conversion media layers 330R, 330G, 330W and the scattering layers 340R, 340G, 340W in FIGS. 12 and 13 are provided between the substrate 310 and the display panel 10. In other words, the color conversion panel, along with FIGS. 12 and 13 comprise the same elements that are referred to as being "on" another element but are disposed in opposite directions.

The liquid crystal panel 50 according to the exemplary embodiment of the inventive concept will be described in more detail with reference to FIG. 12 and FIG. 13.

Gate lines 121 are disposed on a substrate 110. Each gate line 121 includes a gate electrode 124.

A gate insulating layer 140 is disposed on the substrate 110 and the gate lines 121. A semiconductor layer 154 provided in a lower portion of a data line, lower portions of source and drain electrodes 173 and 175, and a channel portion of a thin film transistor Q is disposed on the gate insulating layer 140.

Data lines 171 connected with the source electrode 173 and the source electrode 173 and data conductors 171, 173, and 175 including the drain electrode 175 are disposed on each of the semiconductor layers 154 and the gate insulating layer 140.

The gate electrode 124, the source electrode 173, and the drain electrode 175 form the thin film transistor Q together with the semiconductor layer 154, and a channel of the thin film transistor Q is formed in the semiconductor 154 between the source electrode 173 and the drain electrode 175.

A first protective layer 180 may be disposed on the data conductors 171, 173, and 175 and an exposed portion of the semiconductor layer 154. A light blocking member 220 and a second protective layer 240 are disposed on the first protective layer 180.

The light blocking member 220 is formed with a lattice structure in which openings are formed corresponding to an area that displays an image, and is made of a material which does not transmit light.

The first and second protective layers 180 and 240 and the light blocking member 220 include contact holes 185 exposing the drain electrode 175.

A pixel electrode 191 is disposed on the second protective layer 240. The pixel electrode 191 includes a protruding portion 197 extended toward the gate line 121 from the pixel electrode 191, is physically and electrically connected with the drain electrode 175 through the contact hole 185 in the protruding portion 197, and receives a data voltage from the drain electrode 175.

The description of the thin film transistors and the pixel electrode 191 described above is one example, and the structure of the thin film transistors and the design of the pixel electrode may be modified to enhance side visibility rather than being restrictive to the above-described structure.

A lower alignment layer 11 is disposed on the pixel electrode 191, and the lower alignment layer 11 may be a vertical alignment layer. An upper alignment layer 21 is disposed at a portion facing the lower alignment layer 11, and a microcavity 305 is formed between the lower alignment layer 11 and the upper alignment layer 21.

In the present exemplary embodiment, the lower alignment layer 11 and the upper alignment layer 21 are distinguished from each other only by their positions, and may be connected to each other, as shown in FIG. 13. The lower alignment layer 11 and the upper alignment layer 21 may be simultaneously formed.

Liquid crystal molecules 31 are positioned into the microcavity 350 such that a liquid crystal layer 3 is formed. A plurality if liquid crystal inlets 307FP are formed in a portion where the thin film transistor Q is located, and may be covered by an overcoat 390. The microcavity 305 is divided along the y-axis direction by the plurality of liquid crystal inlets 307FP located in a portion overlapping the gate lines 121 such that a plurality of mictocavities 305 can be formed. Further, the microcavity 305 may is divided along the x-axis direction by a barrier rib portion PWP such that a plurality of microcavities 305 can be formed. Each of the plurality of microcavities 305 may correspond to one or two or more pixel area, and the pixel area may correspond to an area that displays an image.

A common electrode 270 is disposed on the upper alignment layer 21. The common electrode 270 receives a common voltage, and generates an electric field together with the pixel electrode 191 to which a data voltage is applied to determine a direction in which the liquid crystal molecules 31 in the microcavity 305 are inclined. In the present exemplary embodiment, the common electrode 270 is disposed on the microcavity 305, but the common electrode 270 may be disposed below the microcavity 305, thereby enabling liquid crystal driving according to a coplanar electrode mode.

A roof layer 360 is disposed on the common electrode 270. The roof layer 360 supports maintenance of the shape of the microcavity 305, which is a space between the pixel electrode 191 and the common electrode 270.

In the present exemplary embodiment, the barrier rib portion PWP is disposed between microcavities 305 that neighbor along the x-axis direction. The barrier rib portion PWP may be formed along the y-axis direction in which the data line 171 is extended, and may be covered by the roof layer 360. The barrier rib portion PWP is filled with the common electrode 270 and the roof layer 360, and such a structure forms a partition wall to partition or define the microcavity 305.

The overcoat 390 is disposed on the roof layer 360. In this case, the overcoat 390 may cover the liquid crystal inlet 307FP.

Figure 14:
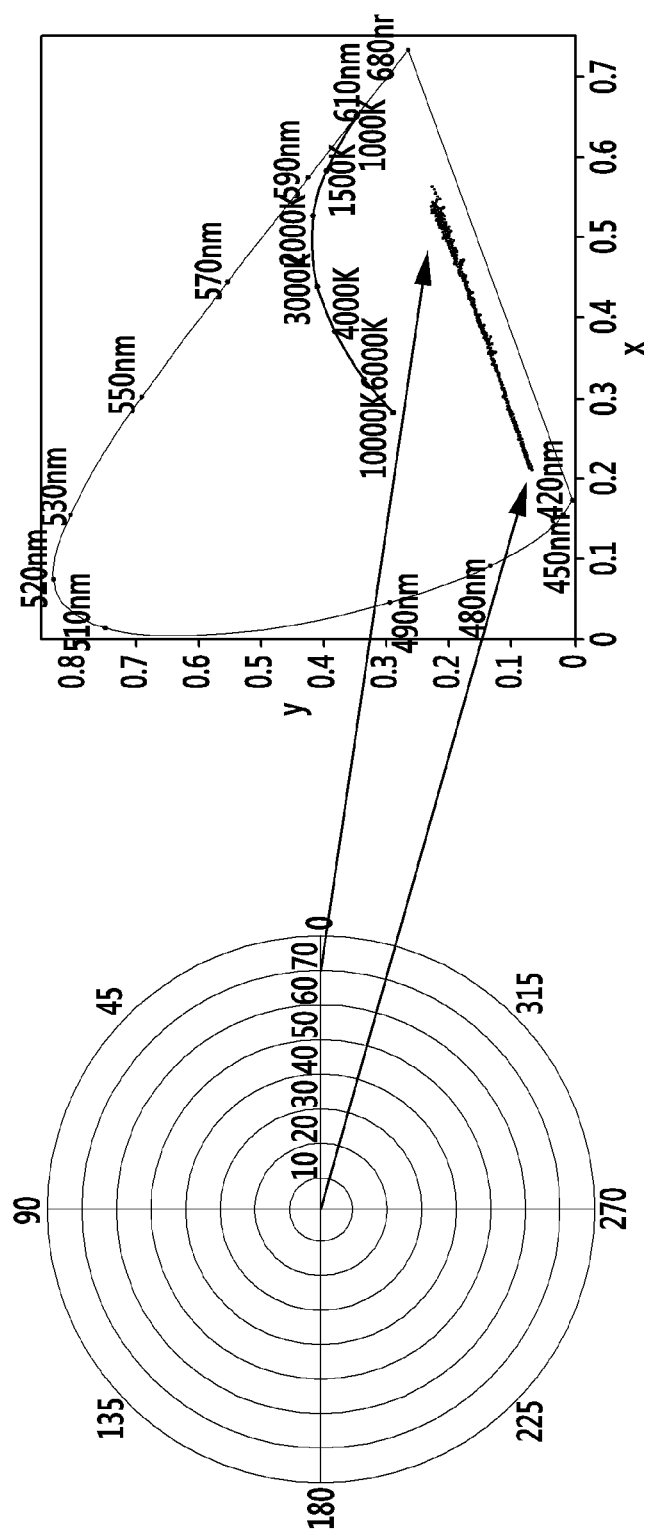
FIG. 14 and FIG. 15 are color coordinate images for examples of the present inventive concept and comparative examples.
Figure 15:
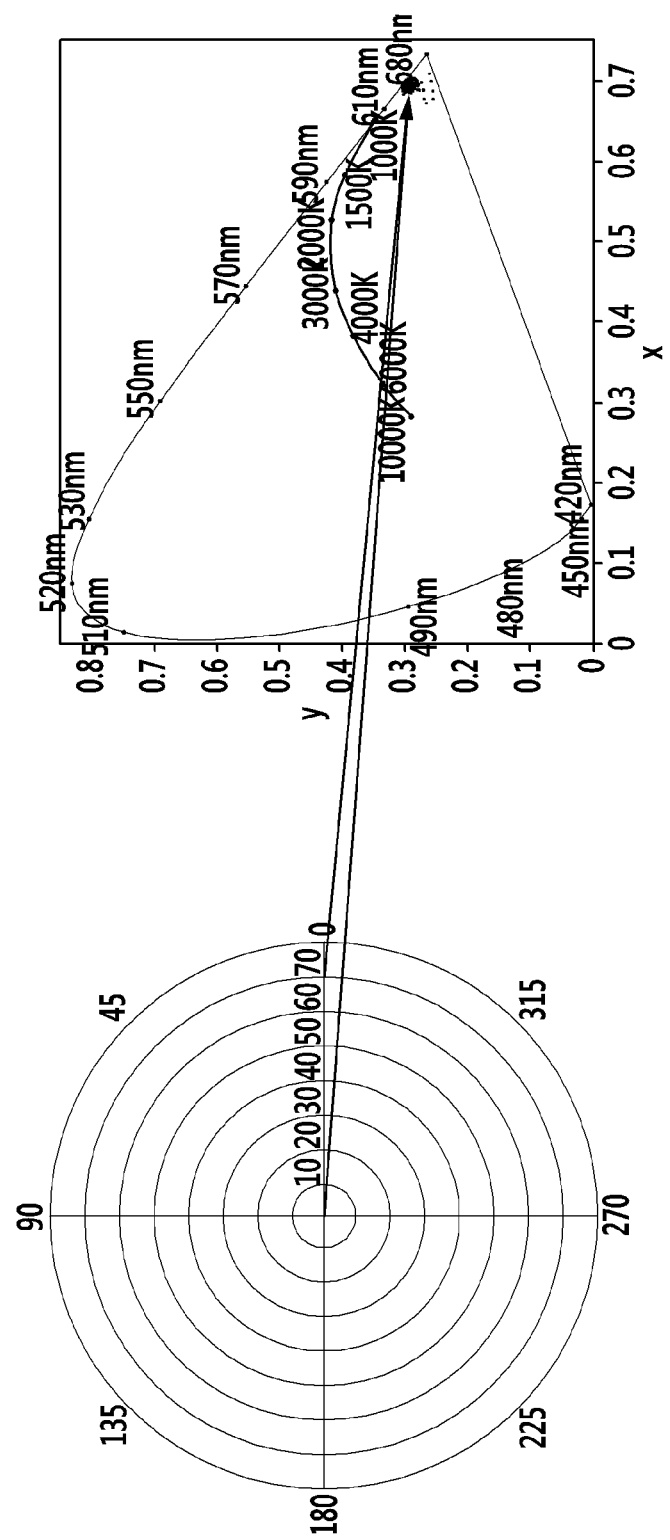

Hereinafter, referring to FIG. 14 and FIG. 15, color reproducibility of a display device according to an exemplary embodiment of the inventive concept will be described. FIG. 14 and FIG. 15 are color coordinate images of an exemplary embodiment of the inventive concept and a comparative example.

First, FIG. 14 is the Comparative Example, and the color coordinate image for the case where a blue diode light source is transmitted with respect to the red color conversion media layer. Reviewing this, it can be confirmed that blue light (having a wavelength band of 400 nm) is transmitted at the center portion of the red color conversion media layer and thus a blue color is seen. In the comparative example, color mixing of blue light occurs to reduce color reproducibility.

Next, FIG. 15 is the example according to the inventive concept, and the color coordinate image for the case where the blue diode light source is transmitted with respect to the red color conversion media layer. Reviewing this, it can be seen that the blue color is hardly seen at the center portion of the red color conversion media layer (waveband length of equal to or greater than 600 nm). It can be seen that through the color coordinate image, color reproducibility is improved.

A more detailed description will be given with reference to the following Table 1.

TABLE 1

| Classification | Scattering layer | Light output ratio | Increase ratio |
|---|---|---|---|
| Comparative Example (there is no scattering layer) | — | 11% | 100% |
| Example (there is scattering layer) | 10 vol % | 18% | 166% |
| | 20 vol % | 19% | 167% |

The comparative example does not include the scattering layer, and thus the light output ratio was about 11%. On the other hand, in the color conversion media layer including the scattering layer according to the exemplary embodiment of the inventive concept, the light output ratio was 18% and 19%. That is, it can be seen that as compared to the comparative example not including the scattering layer, the light output ratio is improved. Further, the increase ratio was confirmed as compared to the comparative example, and as a result, it was confirmed that the light output ratio was improved by about 66% and about 67%.

Therefore, it was confirmed that in the display device according to the exemplary embodiment of the inventive concept, the light output ratio was improved and color reproducibility was improved, and thus the display device having improved display quality could be provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 10: Display panel | 11, 22: Polarizer |
| 30: Color conversion panel | 310: Substrate |
| 330: Color conversion media layer | 340: Scattering layer |

What is claimed is:

1. A display apparatus comprising:
a display panel; and
a color conversion panel disposed on the display panel, wherein the color conversion panel includes:
a plurality of color conversion media layers; and
a scattering layer including a scatterer and at least one of a pigment and a dye adsorbed on the scatterer, the at least one of the pigment and the dye configured to absorb blue light.

2. The display apparatus of claim 1, wherein
at least one of the plurality of color conversion media layer includes at least any one of a fluorescent substance and a quantum dot.

3. The display apparatus of claim 2, further comprising
the plurality of color conversion media layers include a red color conversion media layer, a green color conversion media layer, and a transparent layer.

4. The display apparatus of claim 3, further comprising a light blocking member provided between the adjacent red color conversion media layer, green color conversion media layer, and transparent layer.

5. The display apparatus of claim 4, wherein
the transparent layer does not include the fluorescent substance and the quantum dot.

6. The display apparatus of claim 3, wherein
the scattering layer disposed on the transparent layer does not include the pigment and the dye.

7. The display apparatus of claim 2, wherein
the plurality of color conversion media layers include a photosensitive resin.

8. The display apparatus of claim 1, wherein
the scatterer includes at least one of TiO2, ZrO2, Al2O3, In2O3, ZnO, SnO2, Sb2O3, and ITO.

9. The display apparatus of claim 1, wherein
a density of the scattering layer is larger than a density of the color conversion media layer.

10. The display apparatus of claim 1, wherein
a refractive index of the scattering layer is about 1.5 or more.

11. The display apparatus of claim 1, wherein
the pigment and the dye absorb blue light.

12. The display apparatus of claim 1, further comprising a light assembly supplying light to the display panel and the color conversion panel.

13. The display apparatus of claim 12, wherein
the light assembly is a light emitting diode.

14. The display apparatus of claim 13, wherein
the light emitting diode emits a predetermined wavelength band such as ultraviolet rays or blue light.

15. The display apparatus of claim 12, wherein:
the display panel is disposed between the light assembly and the color conversion panel.

16. The display apparatus of claim 12, wherein the display panel further comprises a liquid crystal panel and polarizers provided in lateral sides of the liquid crystal panel.

17. The display apparatus of claim 16, wherein the display panel comprises:
a thin film transistor provided on a first insulating substrate;
a pixel electrode connected with the thin film transistor;
a second insulating substrate distanced from the first insulating substrate while facing the first insulating substrate;
a liquid crystal layer provided between the first insulating substrate and the second insulating substrate; and
a common electrode provided between the liquid crystal layer and the second insulating substrate.

18. The display apparatus of claim 16, wherein the display panel comprises:
an insulating substrate;
a thin film transistor provided on the insulating substrate;
a pixel electrode connected with the thin film transistor;
a roof layer provided facing the pixel electrode; and
a liquid crystal layer filling a plurality of microcavities provided between the pixel electrode and the roof layer.

19. The display apparatus of claim 1, wherein a portion of the scattering layer includes scatterers where no pigments and dyes are adsorbed on the scatterers.

20. A display apparatus comprising:
a display panel; and
a color conversion panel disposed on the display panel, wherein the color conversion panel includes:
a plurality of color conversion media layers; and
a scattering layer including a scatterer and at least one of a pigment and a dye adsorbed on the scatterer, the at least one of the pigment and the dye configured to absorb blue light,
wherein the scatterer includes at least one of TiO2, ZrO2, Al2O3, In2O3, ZnO, SnO2, Sb2O3, and ITO.

* * * * *